(12) United States Patent
Welsh

(10) Patent No.: US 8,077,112 B2
(45) Date of Patent: Dec. 13, 2011

(54) COLLAPSIBLE TRI-AXIAL FRAME ANTENNA

(75) Inventor: Raphael J. Welsh, Powell, OH (US)

(73) Assignee: Raytheon Company, Waltham, MA (US)

( * ) Notice: Subject to any disclaimer, the term of this patent is extended or adjusted under 35 U.S.C. 154(b) by 487 days.

(21) Appl. No.: 12/234,017

(22) Filed: Sep. 19, 2008

(65) Prior Publication Data

US 2009/0309788 A1 Dec. 17, 2009

Related U.S. Application Data

(60) Provisional application No. 60/974,419, filed on Sep. 21, 2007.

(51) Int. Cl.
*H01Q 7/02* (2006.01)
(52) U.S. Cl. ........................ 343/871; 343/866; 343/867
(58) Field of Classification Search .................. 343/866, 343/867, 871, 741, 742, 881, 915
See application file for complete search history.

(56) References Cited

U.S. PATENT DOCUMENTS

| | | | | |
|---|---|---|---|---|
| 3,587,105 | A * | 6/1971 | Neilson | 343/710 |
| 6,069,564 | A * | 5/2000 | Hatano et al. | 340/572.7 |
| 2007/0046552 | A1* | 3/2007 | Marino | 343/720 |
| 2008/0024304 | A1* | 1/2008 | Bergman et al. | 340/572.7 |

* cited by examiner

*Primary Examiner* — Dieu H Duong

(74) *Attorney, Agent, or Firm* — Daly, Crowley, Mofford & Durkee, LLP

(57) ABSTRACT

A antenna is described including a first frame having a first loop antenna element disposed thereon; a second frame having a second loop antenna element disposed thereon, the second frame disposed perpendicular to the first frame in an operational mode and disposed parallel to the first frame when in a stored mode; and a third frame having a third loop antenna element disposed thereon, the third frame disposed perpendicular to the first and second frame in an operational mode and disposed parallel to the first and second frame when in a stored mode.

20 Claims, 10 Drawing Sheets

Deployed Tri-axial Frame Antenna Configuration

Deployed Tri-axial Frame Antenna Configuration

COLLAPSIBLE TRI-AXIAL FRAME ANTENNA

CROSS-REFERENCE TO RELATED APPLICATIONS

This application claims priority to provisional application Ser. No. 60/974,419, titled "COLLAPSIBLE TRI-AXIAL FRAME ANTENNA", filed Sep. 21, 2007, which is incorporated herein in its entirety.

FIELD OF THE INVENTION

This invention relates generally to antennas and more particularly to a collapsible tri-axial frame antenna to use in a mobile directional finder environment.

BACKGROUND OF THE INVENTION

In directional finding applications, it is often desirable to provide directional finding systems to locate the direction of emitters. Collecting and Direction Finding (DF) in the High Frequency (HF) band, i.e. 1 to 32 MHz, typically requires large antenna arrays requiring lots of real estate to locate an emitter, i.e. a distant end transmitter. For collection of very distant, more powerful HF signals, placement of these large HF systems is only restricted by the local environment and the real-estate available. However, for low power transmitters (several watts such as hand-held or mobile HF radio), these systems are too distant to receive a high enough Signal-to-Noise Ratio (SNR) for signal identification, demodulation, and required DF accuracies.

It would, therefore, be desirable to provide a small, tactical, man-transportable HF system which provides the functional DF capabilities of a large HF array for tactical situations involving low-power, close proximity HF signals. As to be discussed hereinafter, close proximity and mobility provide advantages that allow our contemplated system to approximate the capabilities of large HF DF arrays. By producing a system with these capabilities that is lightweight, collapsible, and able fit into a standard military backpack, a real-time intelligence in the field that is not currently available can be provided.

SUMMARY OF THE INVENTION

In accordance with the present invention, a antenna includes a first frame having a first loop antenna element disposed thereon; a second frame having a second loop antenna element disposed thereon, the second frame disposed perpendicular to the first frame; and a third frame having a third loop antenna element disposed thereon, the third frame disposed perpendicular to the first and second frame in an operational mode and disposed parallel to the first and second frame when in a stored mode. With such an arrangement, an antenna can be proved that operates in the high frequency range in an operational mode, but easily packed up and stored for movement.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Before providing a detailed description of the invention, it may be helpful to review the state of the art of HF directional finding equipment and more particular of an inventive cube antenna as described hereinafter. A cube antenna is based on "Faraday's Induction law" and is sensitive to time-varying magnetic fields associated with radiated or propagating Radio Frequency (RF) energy. By co-locating three orthogonal sensing elements in a single package, the magnetic field vector can be instantaneously characterized in three dimensions. Utilizing the well known laws of RF propagation, the contemplated cube antenna becomes an inherently good DF antenna for both Line-of-Bearing (LOB) and Elevation-of-Arrival (EOA). In some applications, this could result in geo-location capabilities from a single cube antenna. Also, the cube antenna is not a tuned antenna and therefore, has the advantage of instantaneous wide-band collection within its operating frequency limits.

Furthermore, using newly developed enhanced algorithms utilizing robust signal processing techniques, better directional finding capabilities are provided. These techniques take advantage of the three dimensional aspect of the cube antenna, which provides improved reliability and accuracy due to the unique three dimensional DF algorithm that was developed. The cube antenna provides reduced size, weight, and power requirements while improving DF accuracy and reliability and increasing the level of automation.

Figure 1:
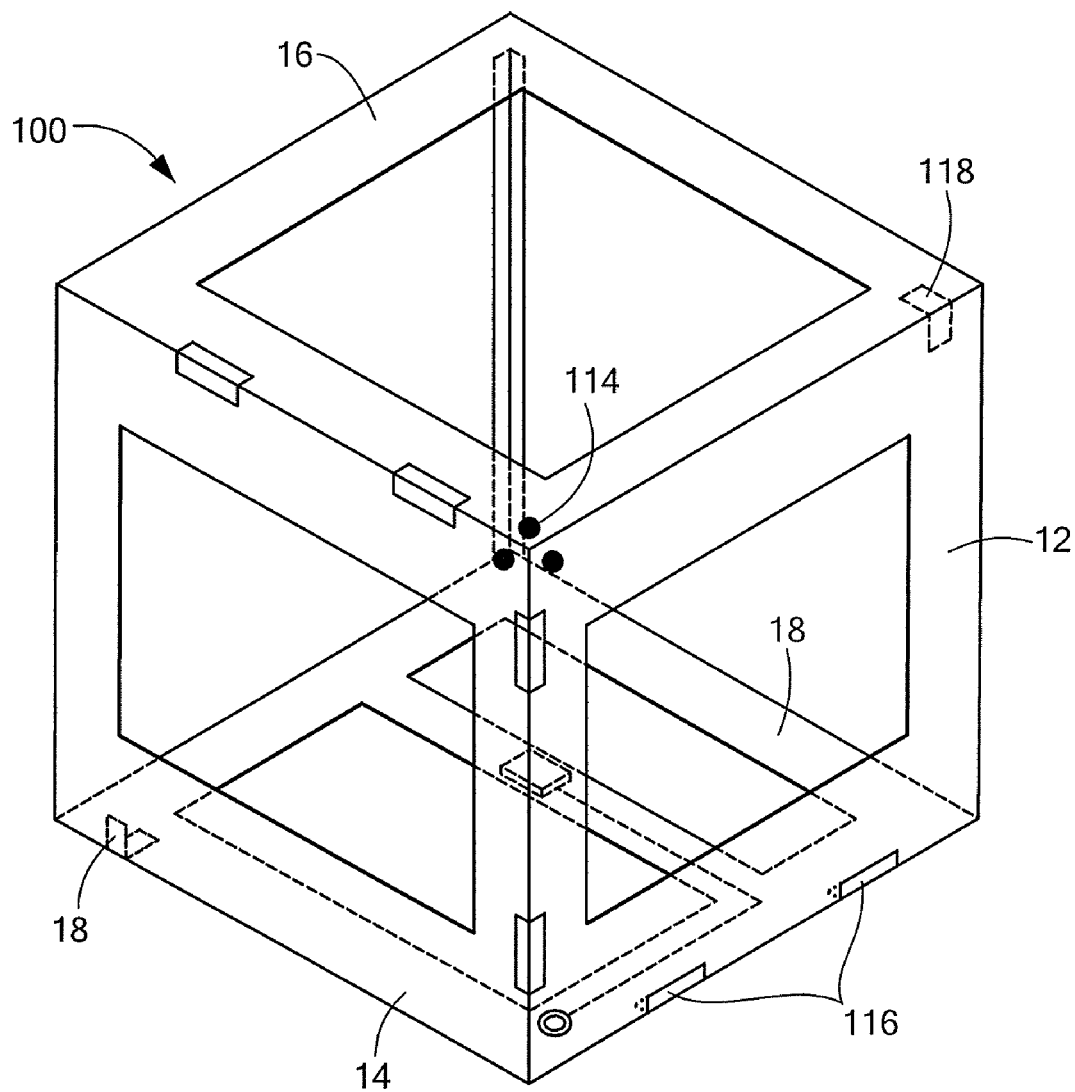
FIG. 1 is a view of a tri-axial frame cube antenna according to the invention.
Figure 1A:
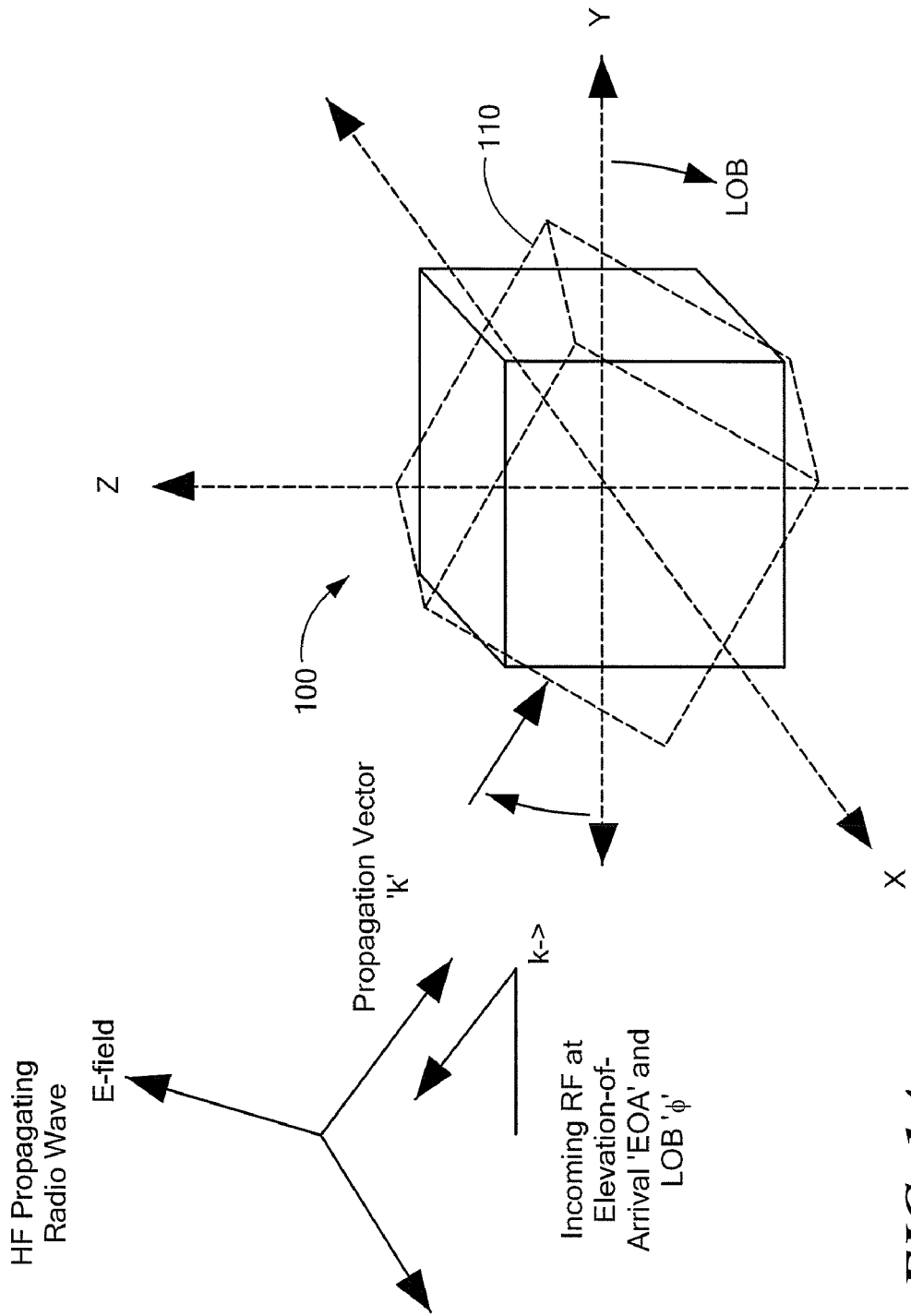
FIG. 1A is a sketch of a three dimensional cube in relation with a propagation vector of an RF signal according to the invention.

Referring now to FIG. 1 and FIG. 1A, a tri-axial frame cube antenna 100 (hereinafter also referred to as cube antenna 10) is based upon "electrically small" loop antenna theory which assumes uniform current throughout the entire perimeter of the frame, a cosine field-amplitude response, deep nulls for magnetic fields parallel to the plane of the frame, and insensitivity to the electric field portion of radiated or propagating Radio Frequency (RF) energy. Given the instantaneous collection of the magnetic field (B) vector in three dimensions by the orthogonal co-located elements, and free-space radio wave propagation theory, three dimensional direction findings algorithms which not only determine line of bearing (LOB) but also elevation of arrival (EOA) become possible from a single site.

A three dimensional DF algorithm utilizes a three channel magnetic field vector as shown in FIG. 1A. The tri-axial frame cube antenna 100 is placed in any orientation. An onboard DCC (Digital Compass/Clinometer) (not shown) measures azimuth, pitch, and roll used in a coordinate system transformation for re-orientation into the standard geomagnetic-based coordinate system where the Y axis is aligned with geomagnetic or true north. The DF algorithm virtually rotates the cube 110 to find the null (direction of the propagation vector le) of the incoming wave on the Y axis in both elevation and azimuth thus giving a three dimensional DF capability from a signal cube.

Figures 2A, 2B:
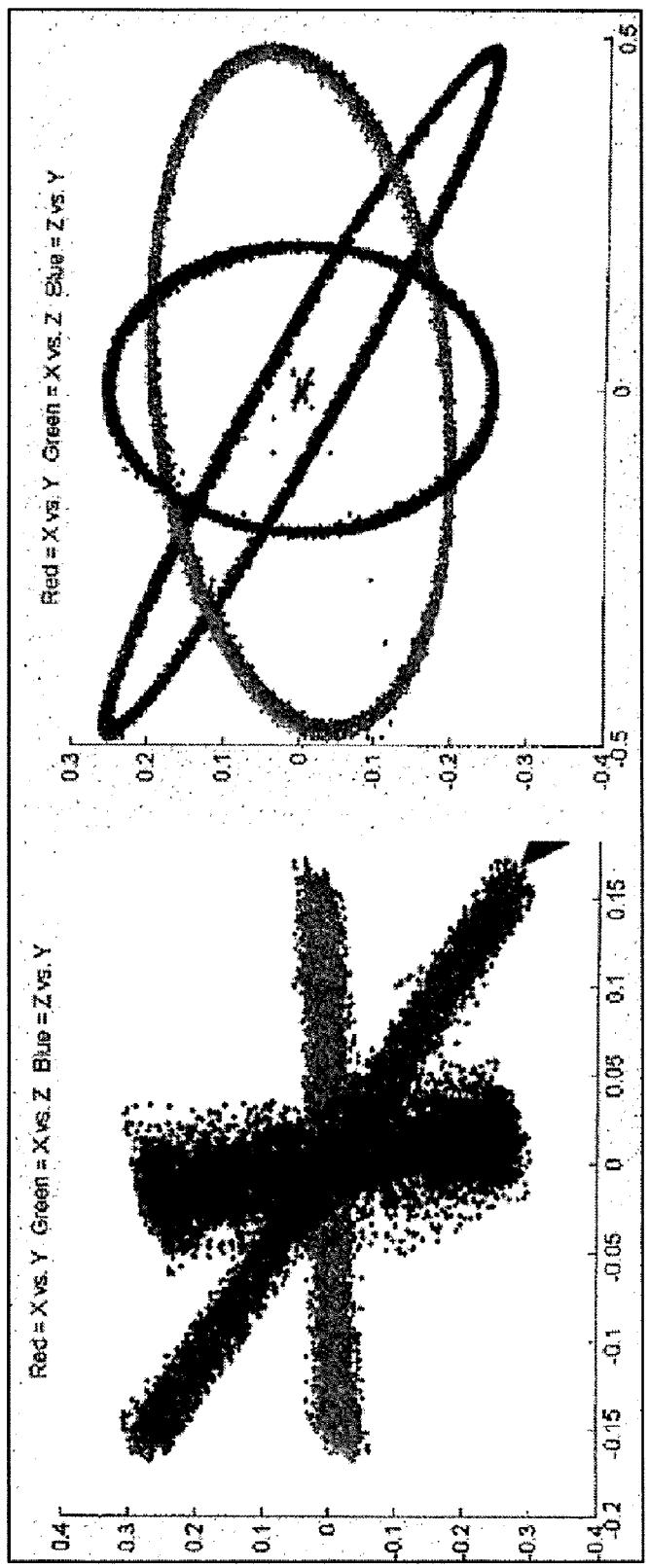
FIGS. 2A and 2B are plots showing where two channels are plotted with respect to each other.

In prior systems, most DFing was done only in two horizontal (X and Y) dimensions. These DF algorithms, however, assume that one channel is simply a scaled copy of the other and therefore, by using amplitude ratios and phases, LOB can be determined. This is usually not the case. As seen in FIGS. 2A and 2B, two different collections are shown where two channels are plotted with respect to each other (X vs Y, X vs Z, and Z vs Y) using different frequencies to emphasize the above. On FIG. 2A, a lower frequency signal demonstrates linear polarization that gives good two dimensional DF because the channels are simply sealed copies of one another. However, as HF frequencies are approached, due to increasing amounts of multi-path and reflections, elliptical polarization results as shown on FIG. 2B, which causes breakdown of the two dimensional assumption and induces DF biasing errors. In most cases, the three dimensional DF algorithms compensate for these effects and minimize DF errors.

Figure 3A:
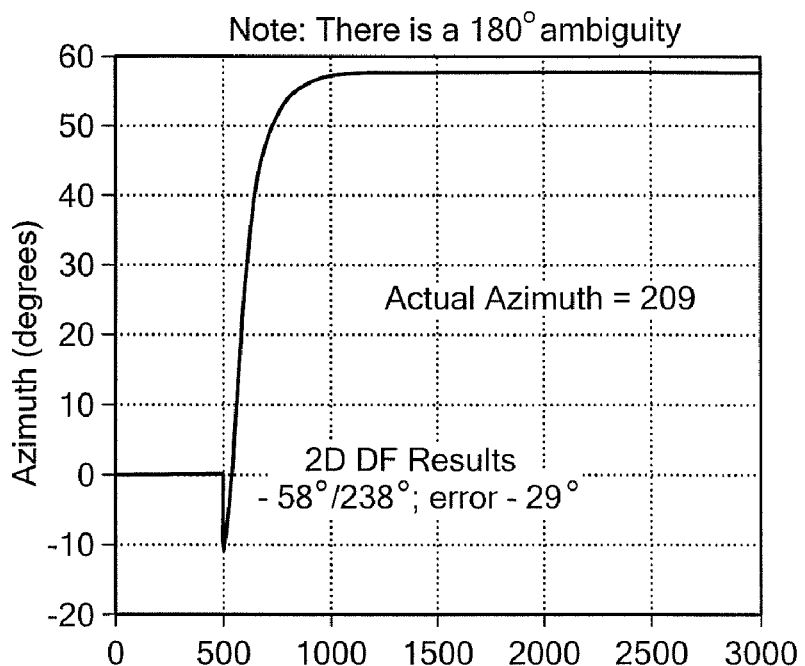
FIGS. 3A and 3B are plots showing the different results for two dimension or three dimension directional finding results.
Figure 3B:
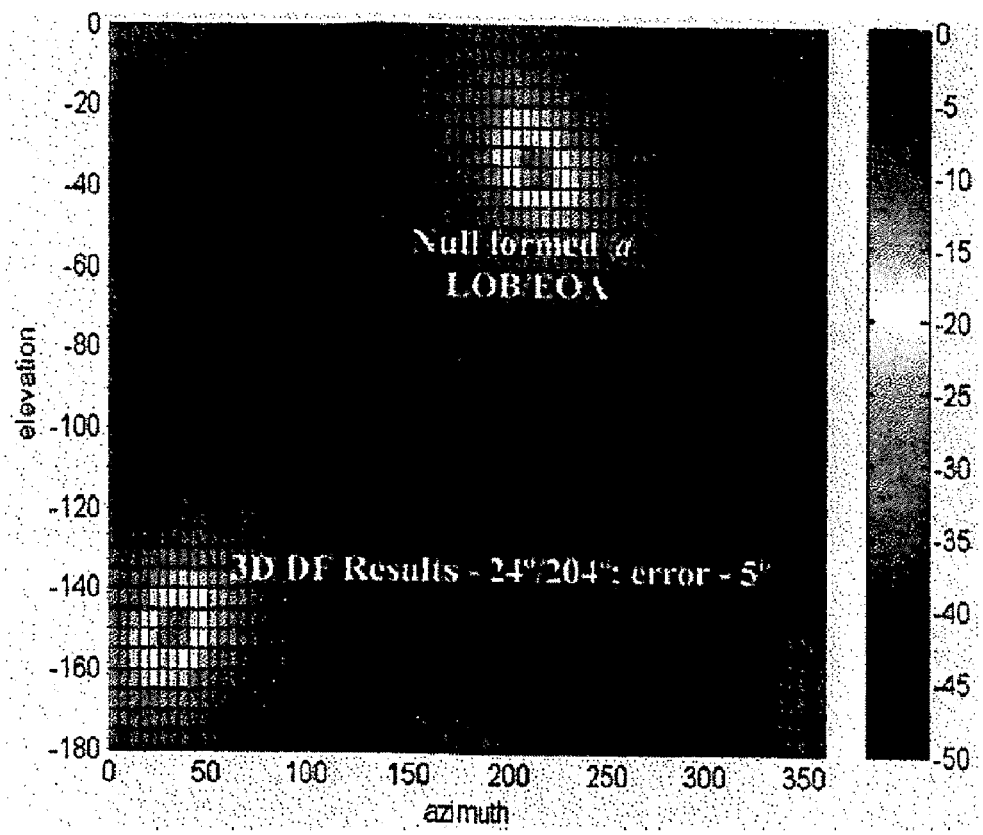

The impact of two versus three dimensional DFing is evident as shown in FIGS. 3A and 3B where the DF results are shown with respect to an actual signal FIG. 3A is the two dimensional measured LOB of 238 degrees where the actual LOB was 209 degrees, giving an error of 29 degrees. The three dimensional LOB was 204 degrees with an BOA of 30 degrees. The DF error was greatly minimized by incorporating the third dimension. Note that there are two DF results given from a single antenna due to the 180° ambiguity inherent in loop antennas.

Figure 4:
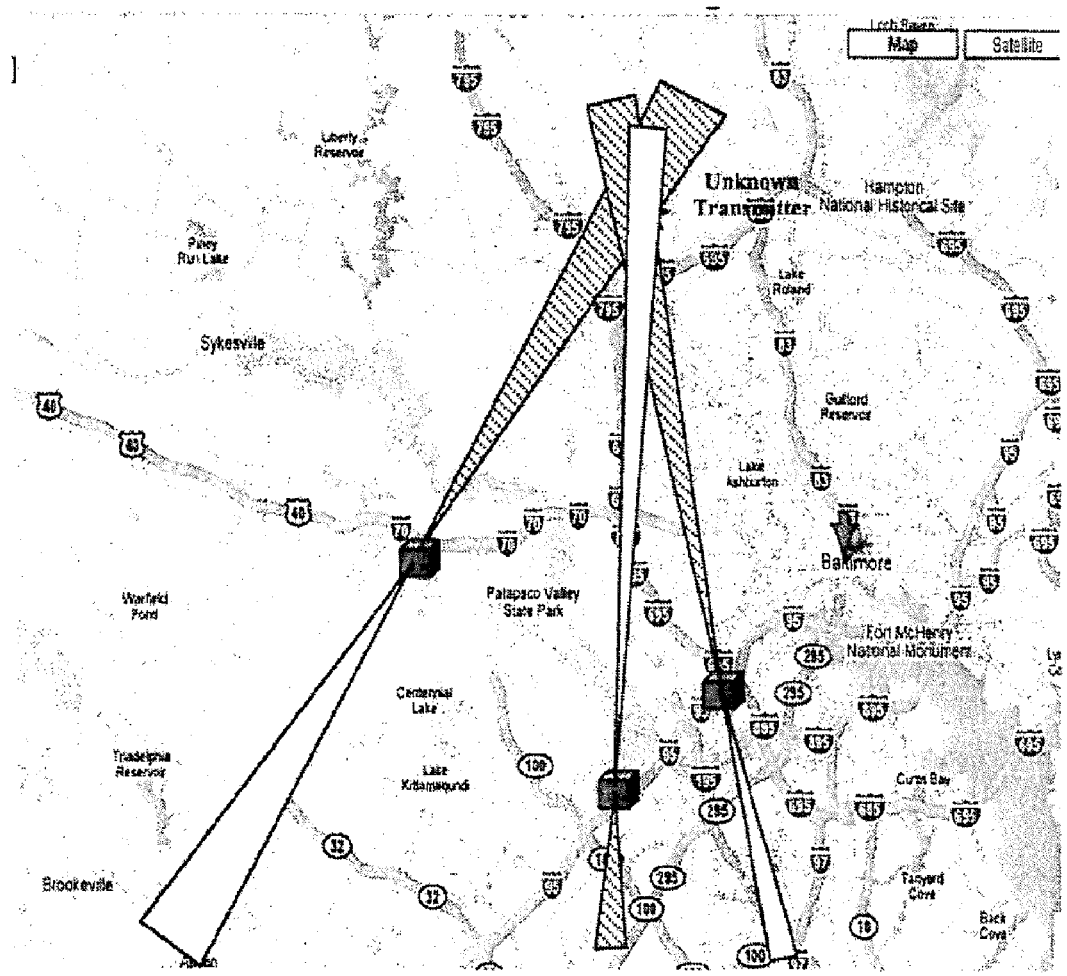
FIG. 4. is sketch showing a directional finding scenario using three cube antennas according the invention.

By using this system in a mobile sense, either by continuously DFing while moving, deploying at multiple locations, or using several antennas with sufficient spatial separation, results in many LOBs eliminating the 180° ambiguity and deriving geo-locations by plotting and overlapping results can be obtained as shown in FIG. 4 using typical directional finding techniques to locate an emitter.

Figure 5:
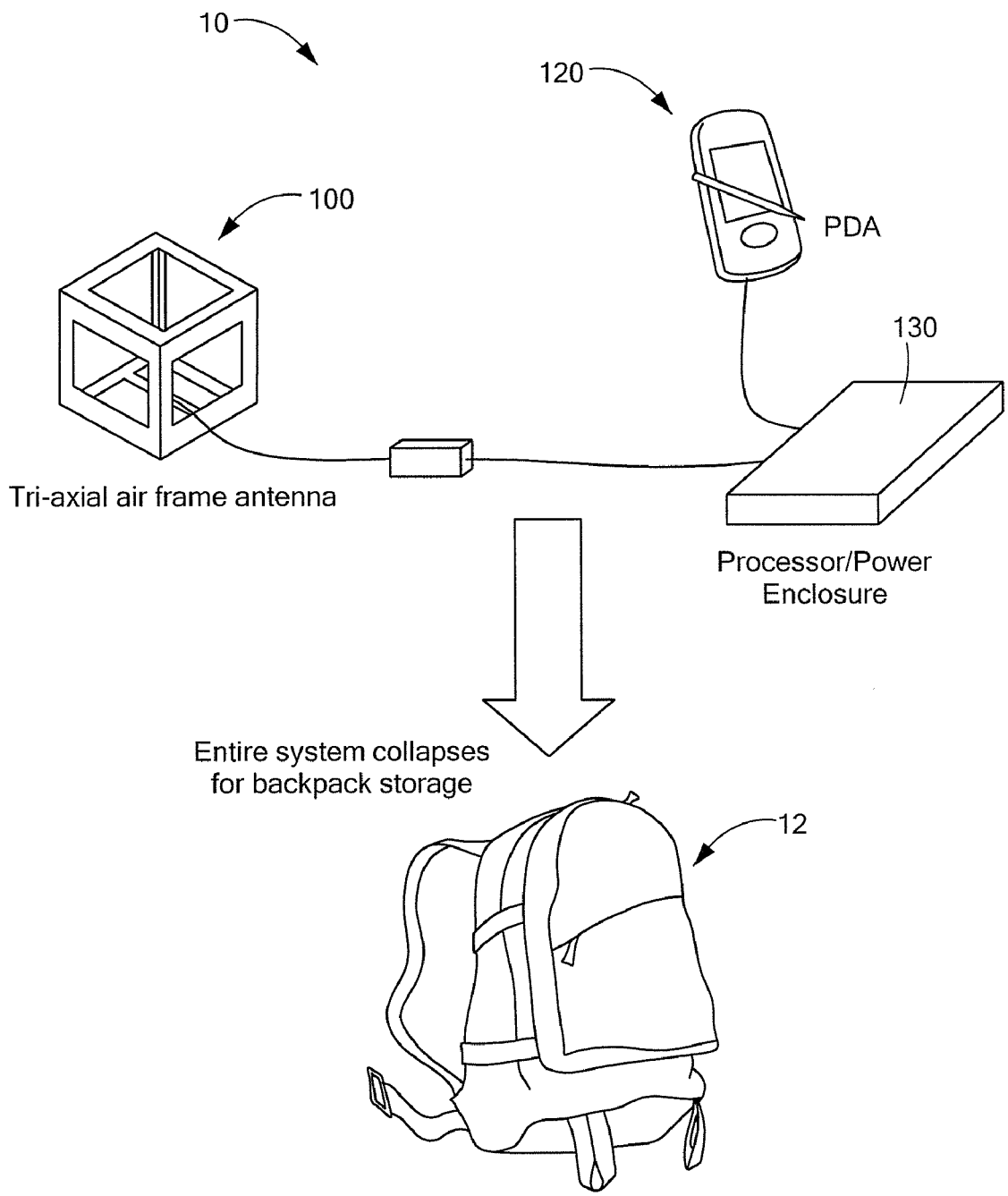
FIG. 5 is showing a deployed high frequency directional finding collapsible man pack system.

Referring now to FIG. 5, it has been observed that using our system 10 in a mobile fashion improves DF accuracies. Essentially, our system's mobility helps to overcome the primary issue with small aperture antennas. This is especially noticeable as the system 10 approaches a target or emitter. We observed that multi-path due to reflections or secondary propagation paths had a diminishing effect on DF biases and therefore, DF accuracies improved. By obtaining DFs from several locations, we are able to perform geo-location from a single cube antenna system 10. The cube antenna system 10 has been demonstrated by using a cube antenna system 10 installed in a vehicle which continuously performed DFs on an unknown test transmitter. The test team was able to find the unknown test transmitter by driving to it, guided by the DF results. Likewise, a war fighter having such a system which could be easily transported and quickly deployed, could not only collect/listen/record but also DF from different sites in order to determine a location of a target transmitter, utilizing enhanced onboard algorithms and mapping software. More specifically, a complete, battery operated system that is capable of being stored in a standard size military backpack can be quickly deployed as needed. As shown in FIG. 5, the entire system 10 collapses for storage in a backpack 12. Hence a collapsible tri-axial frame or cube antenna 100 used with a personal digital assistant (PDA) 120 both connected to a processor/power enclosure 130 provides the collapsible HF man pack system 10.

The collapsible HF man pack system 10 is designed for mobile applications. It can be stored in a standard military backpack and used by personnel on the ground. It can also be mounted quickly on a vehicle. In a typical scenario, an operator (not shown) initiates search for a suspected HF transmitter within a 100 km radius (200 km or more radius for higher powered transmitters). The suspected transmitter could be handheld, low-power vehicle mounted, or a vertical launch antenna used in more mountainous regions. In search mode, the system 10 will identify emitters with operator specified search parameters, showing modulation type, signal strength, and a direction. For signals of interest, the operator views DF results on a geographic information system (GIS) map, storing each DF result. The operator either moves to other locations or receives DF results from other locations. Given multiple DF results, the location of the emitter is shown on the display device or PDA 120.

For ground-based personnel, the operator typically will perform the following basic steps:

1) Unpack the man pack components.
2) Form the tri-axial frame antenna by folding the four plates in place and snapping together the support clamps.
3) Power the processor and a PDA with GPS (which automatically downloads positional data).
4) Connect the cable assembly to the frame antenna and the processor enclosure. The antenna orientation data (bearing, roll, and pitch) are automatically downloaded. This eliminates the need to physically align the antenna.
5) Deployment is completed is less than five minutes.

The system can be powered down, collapsed, and repacked within minutes for easy transport to another location. All HF/DF systems are capable of giving false or misleading results, caused by highly localized environmental issues. Background noise, multi-path, and other issues can typically be eliminated by moving as little as just a few feet. The system 10 provides the operator with feedback to indicate the quality of the DF results. The three dimensional DF algorithm used by the system 10 enhances the quality by analyzing both the bearing and elevation of the arriving signal. There are basically two collection modes the operator can use depending upon the target information at their disposal. The first one is a search and detect mode where there is no prior knowledge of the frequencies or transmit times. In this mode, the operator sets the search bandwidth and uses the energy auto-detect algorithms to lock onto the energy, identify the type of signal, and perform continuous DFs which are subsequently plotted using mapping software. In addition, recording and real-time audio can be obtained.

The second mode of operation would assume the operator has certain prior knowledge of target frequencies. In this mode, an energy detect algorithm would lock onto the target signal when it becomes active, ascertain if it was the proper type of signal, and perform the DF and plot the results. The DF results can be saved from several collection sites or from multiple spatially-separated systems which can be combined for geo-location determination.

As mentioned above, the collapsible HF/DF collection system 10 is capable of being compacted so as to fit into a standard-size military backpack. The system can be totally setup and initialized within minutes. Breakdown and storage into the backpack will likewise be easily accomplished. With the exception of some user defined parameters, the operation of the system is mostly automated. The system can be continuously powered for up from 5 to 8 hours with no external power source by onboard lithium ion polymer battery packs. Power can also be provided externally for uninterrupted operation.

Referring now to FIG. 1, the tri-axial frame cube antenna 100 is collapsible and shown in its operational form. At the vertex of the three sensing element frames (X, Y, Z) which form a Cartesian coordinate system, are the connectors 114 in which the a cable assembly is attached. Another connection is used to power and transfer DCC data to the processor enclosure 130.

Figure 6:
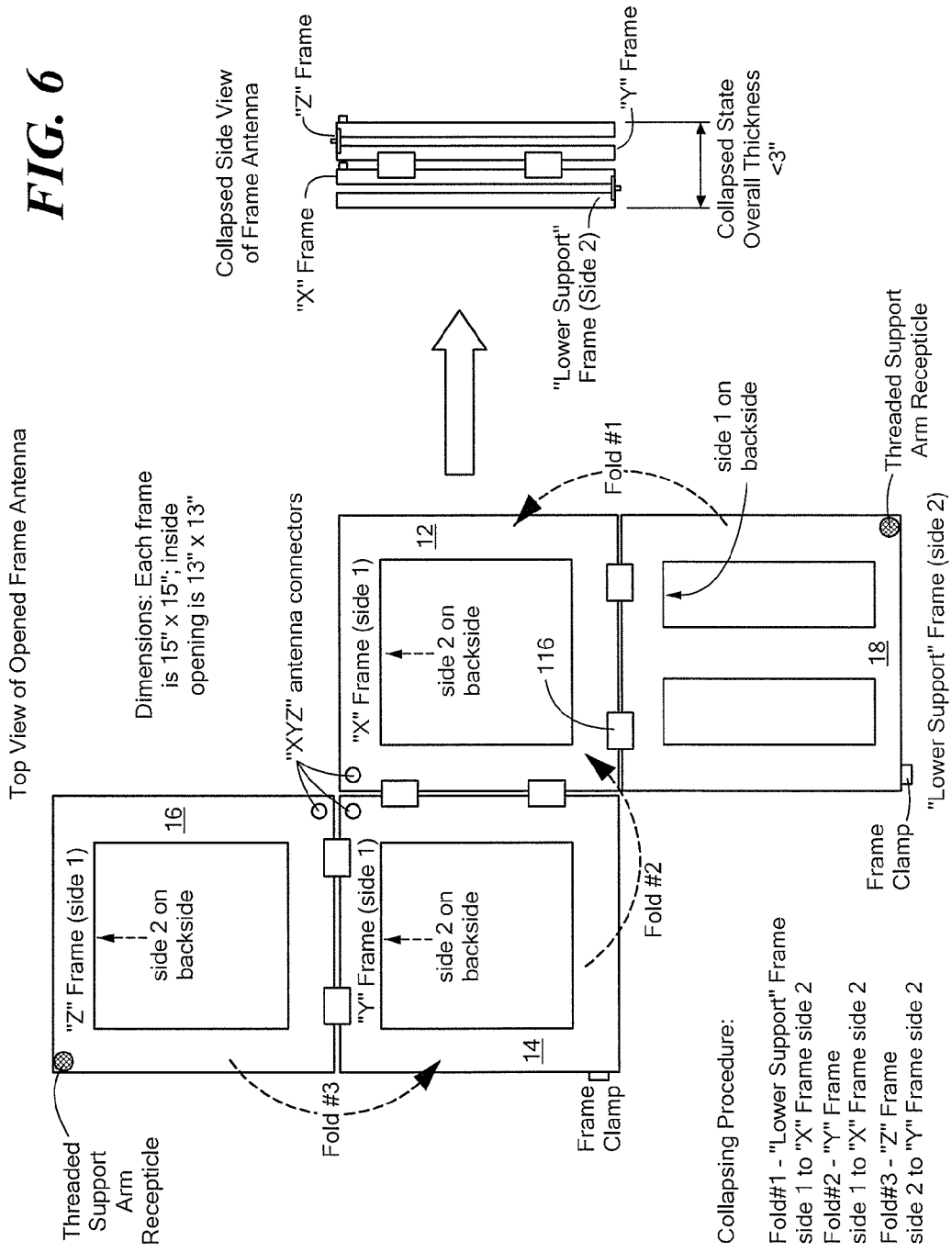
FIG. 6 is an illustration of the antenna collapsing procedure to provide a collapsed antenna according to the invention.
Figure 7:
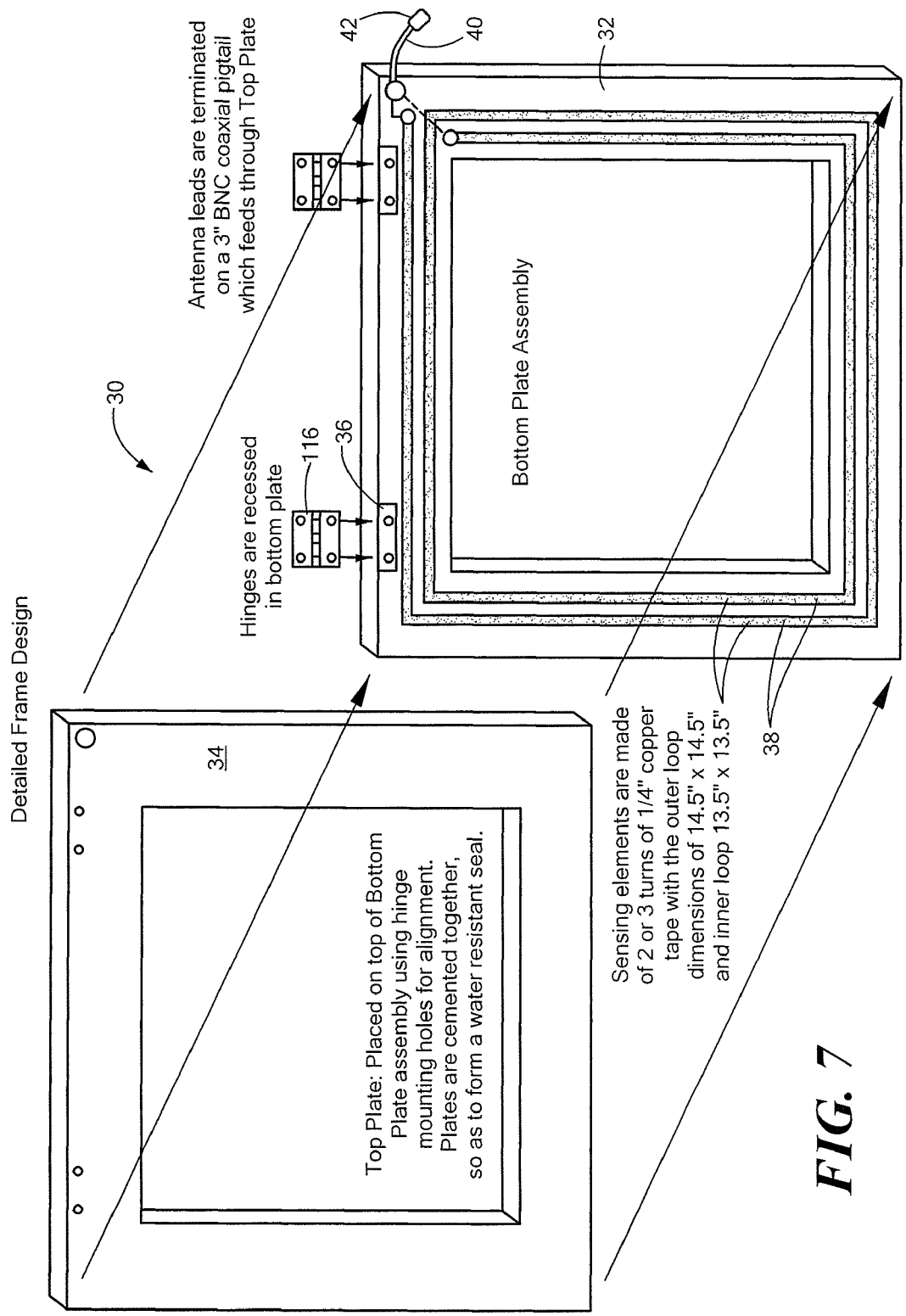
FIG. 7 is an illustration showing details of the frame.

Referring now also to FIG. 6, each one of the frames 12, 14, 16, 18 is hinged to an adjacent frame by hinges 116. When preparing to store the antenna 100, the frames 12, 14, 16, 18 unfold as illustrated in FIG. 6. After following a simple folding procedure, the entire cube antenna 100 compacts down to a small package 15"×15"×8" with a cavity formed in the center large enough to fit the processing enclosure 130. As shown in more detail in FIG. 7, each one of the frames 12, 14 and 16 are fabricated as a frame 30 having a bottom plate assembly 32 and a top plate assembly 34. The bottom plate assembly 32 and the top plate assembly 34 are made of acrylic glass such as Plexiglas or other nonconductive material having an outer dimension of approximately 15 inches by 15 inches and an inner dimension of approximately 13 inches by 13 inches as shown. The hinges 116 are mounted in recessed space 36 to the bottom plate assembly 32 as shown. Antenna elements include sensing elements made of two or three turns of ¼ inch copper tape 38 with an outer loop dimension of approximately 14.5 inches by 14.5 inches and an inner loop dimension of approximately 13.5 inches by 13.5 inches as shown. Antenna leads are terminated on a 3 inch coaxial pigtail 30 having a BNC connector 42 which feeds through the top plate assembly 34. The bottom plate assembly 32 is connected to the top plate assembly 34 with cement to form a water resistant seal. Each of the BNC connectors 42 from frames 12, 14, and 16 respectively are connected to coaxial cables that are fed to the data acquisition card in the processor/power enclosure 130 appropriately.

Figure 8:
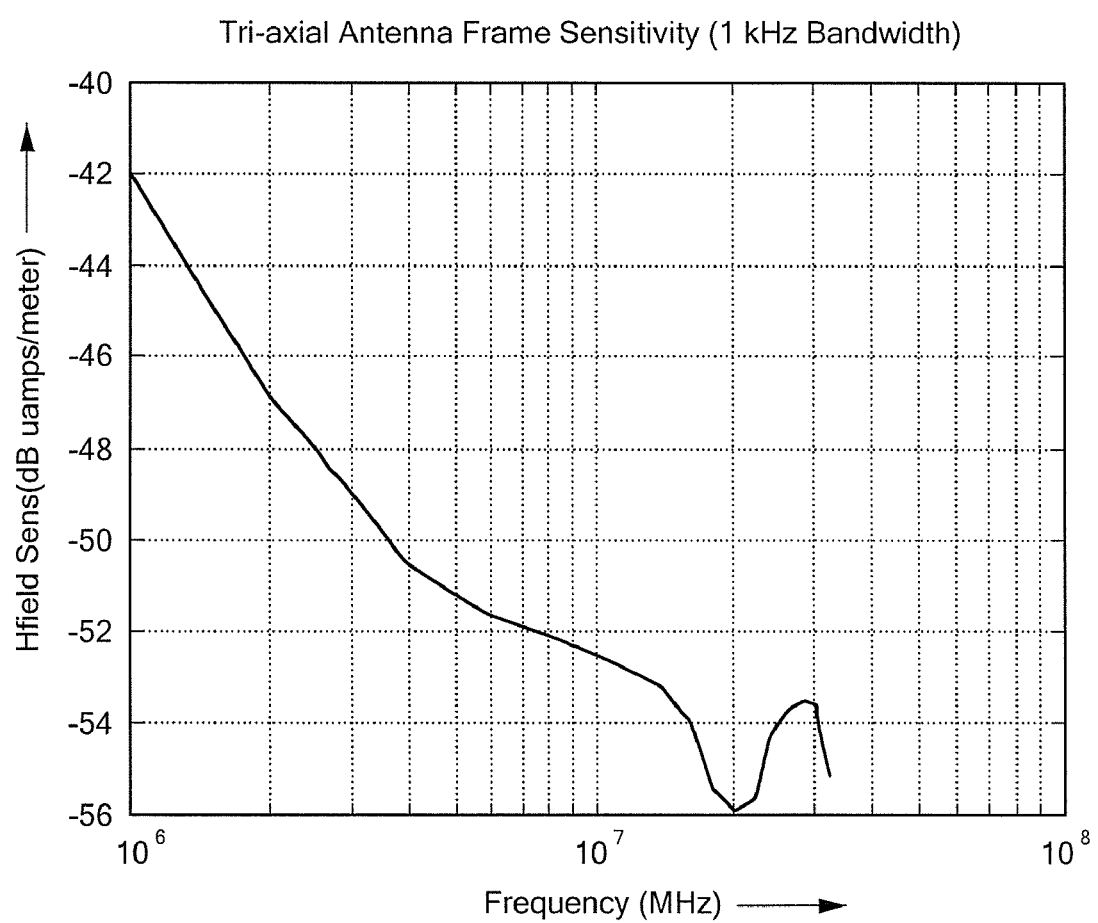
FIG. 8 is a plot showing a typical H-Field Sensitivity chart.
Figure 9:
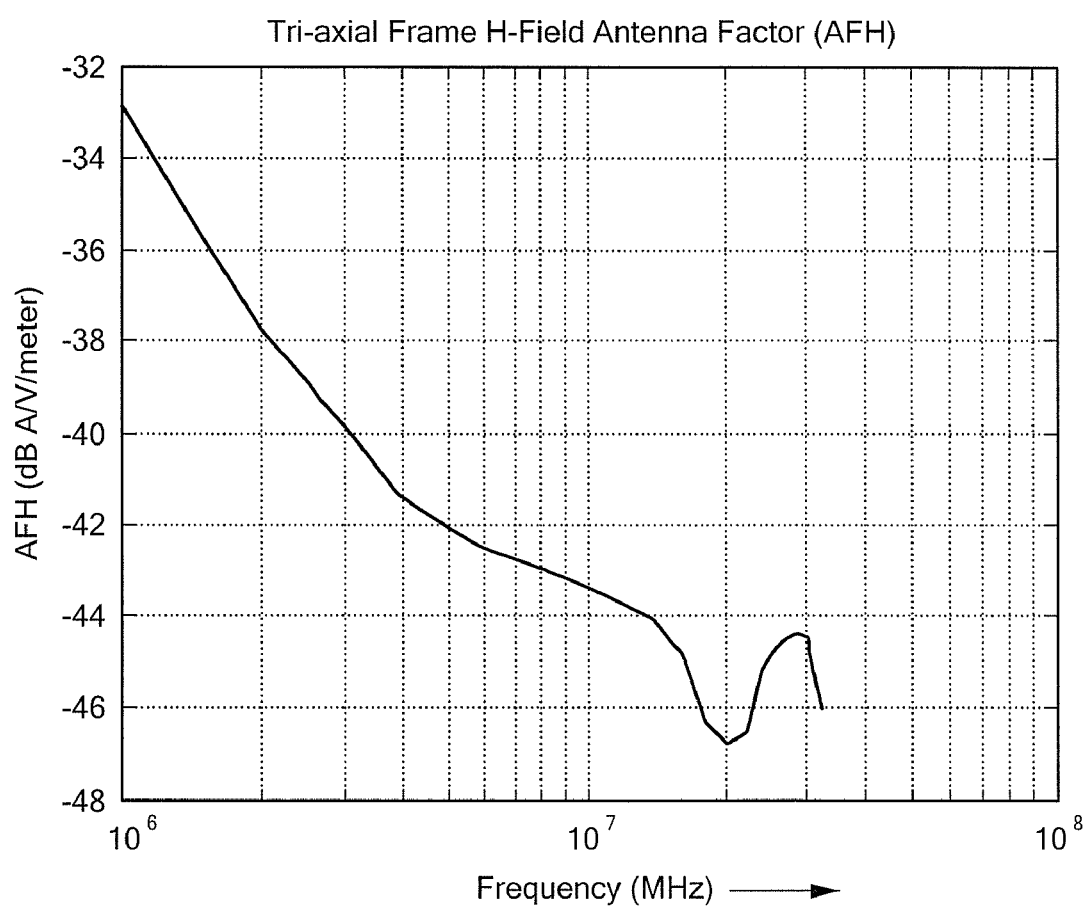
FIG. 9 is a plot showing a typical H-Field Antenna Factor.

The processor/power enclosure 130 contains a processor motherboard, a Data Acquisition Card (DAQ) which receives the XYZ wideband analog data, a 2.5" disk drive, a power supply and power conditioner along with a high capacity battery pack. The wireless PDA (or laptop computer) 120 will provide a user interface as well as location data via an integrated global positioning system (GPS) functionality. The entire system 10 is designed to be compacted into a small volume (15"×15"×8") that will easily fit into a military backpack or any transportable enclosure the size of a briefcase. The system is designed to operate in the frequency range of 0.3 MHz to 32 MHz and as shown on FIG. 8 a typical H-field sensitivity curve. FIG. 8 shows typical sensitivity defined as the Minimum Detectable H-Field (MDF) referred to a 1 kHz bandwidth in dB Lamps/meter. FIG. 9 depicts a typical H-Field Antenna Factor (AFH) defined as the ratio of the amount of voltage developed at the output of the antenna's front-end electronics (50 ohm) with reference to the magnetic field strength (H-Field) seen by the antenna given in dB amps/volt/meter. The following specifications are typical:

DF Accuracy: <2 degrees rrns (assumes free space test range conditions)
Power: <30 watts; External charging voltage −6 to 26 Vdc
Continuous operation (onboard batteries only): 5 to 8 hrs
Size: 15"×15"×8" (complete system collapsed); 15"×15"× 15" (frame antenna deployed)
Weight: <25 lbs (complete system with batteries and processor)

The system 10 is implemented utilizing the client/server paradigm. A server provides DF and demodulation services to the client which in turns requests specific frequencies and modulation types. In one configuration, the server software is ported to the man pack processor and a control and status GUI is hosted in a laptop. The system will allow the user to tune to Signals-of-Interest (SOI), display the computed line of bearing to the SOI, and demodulate AM and SSB signals.

In another configuration, the server's capabilities include wideband search for active SOIs, automated modulation recognition, automatic DF of SOIs, and additional demodulation types. The User Interface is implemented on the PDA 120. It will include a GPS interface, GIS mapping displays to show the line of bearing relative to the operator's current location, SOI filtering based on signal type and/or line of bearing, and historical displays of bearings taken from other locations.

The man pack will provide an effective additional tool with emphasis on supporting the strategy that "every soldier is a sensor". The man pack is a portable, light-weight sensor that can easily be transported; it weighs less than 30 lbs. The man pack is capable of supporting expeditionary field units, or perimeter and security patrols on foot or mobilized, engaged in the detection, geolocation, isolation, and engagement of adversaries using traditional radio frequency spectrum communications. It provides field unit capabilities to act autonomously, and also to act as part of an integrated self forming signal detection network. It will transform battlefield operations allowing for a faster, more agile force with superior situational awareness and lethality.

The man pack will support a variety of operations against any level threat, in any environment. It balances capabilities for battle space dominance and decisive battlefield information superiority with its small size, agility, deploy-ability and rugged sustainability. It provides the Army a capability to engage the enemy in unexpected ways, maneuver to advantageous positions with speed and accuracy, and then subsequently engage enemy forces with the advantage of surprise. In a stand-alone mode at the unit level or beyond, the man pack can aid the warrior in detecting and rapidly isolating communications signals in the field. It promotes unit level autonomy, agility, and lethalness. In a more integrated mode, the man pack becomes part of a self-forming battlefield HF DF net. In this application, the man pack can be linked to other man packs or similar devices, enabling both cross-unit and warrior unit-to-mobile unit detection integration. The man pack can also be integrated with sensors on a UAV, ARV, or UGS. In either mode, the man pack supports high tempo, fast-paced, battlefield operations without requiring often time consuming coordination with theater and national authorities, systems and processes.

It should now be appreciated a collapsible antenna as described above includes a first frame having a first loop antenna element disposed thereon, the loop antenna element comprising at least two turns of copper tape arranged in a loop; a second frame having a second loop antenna element disposed thereon, the second loop antenna element comprising at least two turns of copper tape arranged in a loop, the second frame disposed perpendicular to the first frame in an operational mode and disposed parallel to the first frame when in a stored mode; a third frame having a third loop antenna element disposed thereon, the third loop antenna element comprising at least two turns of copper tape arranged in a loop, the third frame disposed perpendicular to the first and second frame in an operational mode and disposed parallel to the first and second frame when in a stored mode; and a fourth frame, the fourth frame disposed parallel to the first frame and perpendicular to the second and third frame in an operational mode and disposed parallel to the first, second and third frame when in a stored mode.

Furthermore the above teachings can be used to provide a directional finding system to include a digital high frequency radio processor to receive and process HF radio signals; a personal digital assistant (PDA) having a global positioning system receiver to provide positional data, the personal digital assistant coupled to the radio processor; and an antenna connected to the radio processor, the antenna comprising: a first frame having a first loop antenna element disposed thereon, the loop antenna element comprising at least two turns of copper tape arranged in a loop; a second frame having a second loop antenna element disposed thereon, the second loop antenna element comprising at least two turns of copper tape arranged in a loop, the second frame disposed perpendicular to the first frame in an operational mode and disposed parallel to the first frame when in a stored mode; a third frame having a third loop antenna element disposed thereon, the third loop antenna element comprising at least two turns of copper tape arranged in a loop, the third frame disposed perpendicular to the first and second frame in an operational mode and disposed parallel to the first and second frame when in a stored mode; and a fourth frame, the fourth frame disposed parallel to the first frame and perpendicular to the second and third frame in an operational mode and disposed parallel to the first, second and third frame when in a stored mode. The latter is configured such that the antenna in the operational mode is arranged using the Cartesian coordinate system where the first frame is aligned to the Z-coordinate axis, the second frame is aligned to the Y-coordinate axis and the third frame is aligned with the X-coordinate axis and wherein the digital high frequency radio processor includes a three dimensional directional finding algorithm to process the three inputs from the loop antenna elements to resolve a potential targets direction using all three channels. The digital high frequency radio processor includes an algorithm to virtually rotate the antenna to find a null of an incoming wave on the Y-coordinate axis in both elevation and azimuth to resolve the direction of a radio frequency source.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

What is claimed is:

1. A collapsible antenna comprising:
a transportable antenna reconfigurable to carry in a man pack in a stored mode and to receive high frequency signals in an operational mode, the transportable antenna comprising:
a first frame having a first loop antenna element disposed thereon;
a second frame having a second loop antenna element disposed thereon, the second frame disposed perpendicular to the first frame in an operational mode and disposed parallel to the first frame when in a stored mode;
a third frame having a third loop antenna element disposed thereon, the third frame disposed perpendicular to the first and second frame in an operational mode and disposed parallel to the first and second frame when in a stored mode.

2. The collapsible antenna as recited in claim 1 comprising a fourth frame, the fourth frame disposed parallel to the first frame and perpendicular to the second and third frame in an operational mode and disposed parallel to the first, second and third frame when in a stored mode.

3. The collapsible antenna as recited in claim 2 wherein an edge of the first frame is pivotally fastened to an edge of the second frame; an edge of the third frame is pivotally fastened to a second edge of the second frame; and an edge of the fourth frame is pivotally fastened to an edge of the third frame.

4. The collapsible antenna as recited in claim 3 wherein the first, second, third and fourth frames are arranged to provide a cube shape structure in an operational mode and the first, second, third and fourth frames are arranged parallel to each other in a stored mode.

5. The collapsible antenna as recited in claim 1 wherein at least one frame comprises an acrylic glass.

6. The collapsible antenna as recited in claim 1 wherein at least one loop antenna element comprises at least two turns of copper tape disposed on a frame.

7. The collapsible antenna as recited in claim 1 wherein an edge of the first frame is pivotally fastened to an edge of the second frame and an edge of the third frame is pivotally fastened to a second edge of the second frame.

8. A collapsible antenna comprising:
a transportable antenna reconfigurable to carry in a man pack in a stored mode and to receive a high frequency signal in an operational mode, the transportable antenna comprising:
a first frame having a first loop antenna element disposed thereon, the loop antenna element comprising at least two turns of copper tape arranged in a loop;
a second frame having a second loop antenna element disposed thereon, the second loop antenna element comprising at least two turns of copper tape arranged in a loop, the second frame disposed perpendicular to the first frame in an operational mode and disposed parallel to the first frame when in a stored mode;
a third frame having a third loop antenna element disposed thereon, the third loop antenna element comprising at least two turns of copper tape arranged in a loop, the third frame disposed perpendicular to the first and second frame in an operational mode and disposed parallel to the first and second frame when in a stored mode; and
a fourth frame, the fourth frame disposed parallel to the first frame and perpendicular to the second and third frame in an operational mode and disposed parallel to the first, second and third frame when in a stored mode.

9. The collapsible antenna as recited in claim 8 wherein an outer loop dimension of the copper tape of the first loop antenna element is between fourteen and fifteen inches.

10. The collapsible antenna as recited in claim 8 wherein an inner loop dimension of the copper tape of the first loop antenna element is between thirteen and fourteen inches.

11. The collapsible antenna as recited in claim 8 wherein an edge of the first frame is pivotally fastened to an edge of the second frame; an edge of the third frame is pivotally fastened to a second edge of the second frame; and an edge of the fourth frame is pivotally fastened to an edge of the third frame.

12. The collapsible antenna as recited in claim 8 wherein each one of the loop antenna elements are terminated with a coaxial cable connector, each one of the connectors connected to coaxial cable to connect to a digital high frequency radio processor.

13. The collapsible antenna as recited in claim 8 wherein each one of the frames comprises an acrylic glass.

14. The collapsible antenna as recited in claim 8 wherein the first frame comprises a first and second sheet of acrylic glass and the loop antenna element is disposed between the first and second sheet of acrylic glass.

15. A directional finding system comprising:
- a digital high frequency radio processor to receive and process HF radio signals;
- a personal digital assistant (PDA) having a global positioning system receiver to provide positional data, the personal digital assistant coupled to the radio processor; and
- an antenna connected to the radio processor, the antenna comprising:
  - a first frame having a first loop antenna element disposed thereon, the loop antenna element comprising at least two turns of copper tape arranged in a loop;
  - a second frame having a second loop antenna element disposed thereon, the second loop antenna element comprising at least two turns of copper tape arranged in a loop, the second frame disposed perpendicular to the first frame in an operational mode and disposed parallel to the first frame when in a stored mode;
  - a third frame having a third loop antenna element disposed thereon, the third loop antenna element comprising at least two turns of copper tape arranged in a loop, the third frame disposed perpendicular to the first and second frame in an operational mode and disposed parallel to the first and second frame when in a stored mode; and
  - a fourth frame, the fourth frame disposed parallel to the first frame and perpendicular to the second and third frame in an operational mode and disposed parallel to the first, second and third frame when in a stored mode.

16. The directional finding system as recited in claim 15 wherein the digital high frequency radio processor operates in the frequency range of 0.3 MHz to 32 MHz.

17. The directional finding system as recited in claim 15 wherein each one of the loop antenna elements are terminated with a connector and the digital high frequency radio processor comprises three radio frequency inputs to connect to a respective one of the connectors of the loop antenna elements.

18. The directional finding system as recited in claim 17 wherein the antenna in the operational mode is arranged using the Cartesian coordinate system where the first frame is aligned to the Z-coordinate axis, the second frame is aligned to the Y-coordinate axis and the third frame is aligned with the X-coordinate axis.

19. The directional finding system as recited in claim 18 wherein the digital high frequency radio processor includes a three dimensional directional finding algorithm to process the three inputs from the loop antenna elements to resolve a potential targets direction using all three channels.

20. The directional finding system as recited in claim 19 wherein the digital high frequency radio processor includes an algorithm to virtually rotate the antenna to find a null of an incoming wave on the Y-coordinate axis in both elevation and azimuth.

* * * * *